(12) United States Patent
Kanter et al.

(10) Patent No.: US 10,606,466 B2
(45) Date of Patent: *Mar. 31, 2020

(54) PRESENTING ADDITIONAL CONTENT TO AN ONLINE SYSTEM USER BASED ON USER INTERACTION WITH A SCROLLABLE CONTENT UNIT

(71) Applicant: Facebook, Inc., Menlo Park, CA (US)

(72) Inventors: Jeffrey Andrew Kanter, San Francisco, CA (US); Sanchan Sahai Saxena, Milpitas, CA (US); Mohit Rajani, San Francisco, CA (US); Andrew Sean Yang, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 14/798,267

(22) Filed: Jul. 13, 2015

(65) Prior Publication Data

US 2017/0017369 A1     Jan. 19, 2017

(51) Int. Cl.
*G06F 3/0485*     (2013.01)
*G06F 3/0482*     (2013.01)

(52) U.S. Cl.
CPC .......... *G06F 3/0485* (2013.01); *G06F 3/0482* (2013.01)

(58) Field of Classification Search
CPC ............... G06F 3/0485; G06F 3/0482; G06F 17/30896; G06Q 30/02; G06Q 30/0212; G06Q 30/0217; G06Q 30/0241; G06Q 30/0277; G09B 7/00
See application file for complete search history.

(56) References Cited

U.S. PATENT DOCUMENTS

| 6,084,628 A | 7/2000 | Sawyer | |
| 8,396,746 B1 | 3/2013 | Wang | |
| 8,560,405 B1 * | 10/2013 | Buron | G06Q 30/06 705/26.41 |

(Continued)

OTHER PUBLICATIONS

MSN, "Richest countries in the world", (Oct. 27, 2014), <URL https://www.msn.com/en-ae/money/today/richest-countries-in-the-world/ss-BBbE2tX#image=1/>, p. 1-9 (Year: 2014).*
Moritz, "How to Hyperlink Slides and Layers", (Dec. 8, 2013), <URL https://www.themepunch.com/faq/how-to-hyperlink-slides-and-layers/>, p. 1-8 (Year: 2013).*

(Continued)

*Primary Examiner* — Ajay M Bhatia
*Assistant Examiner* — Mong-Shune Chung
(74) *Attorney, Agent, or Firm* — Fenwick & West LLP

(57) ABSTRACT

An online system presents a feed of content including content items and one or more scrollable content units to a user of the online system. A scrollable content unit includes an ordered set of content items sharing a common attribute, such as advertisement requests associated with the same advertising campaign or images associated with a common subject. The scrollable content unit is scrollable in a direction that is orthogonal to an orientation of the feed of content, allowing presentation of additional content items from the ordered set when a user navigates through the ordered set. When all content items in the ordered set have been displayed by the scrollable content unit, an interaction with the scrollable content unit by the user presents additional content associated with the ordered set of content items, such as a page associated with the common attribute of content items in the ordered set.

22 Claims, 4 Drawing Sheets

(56) References Cited

U.S. PATENT DOCUMENTS

| | | | |
|---|---|---|---|
| 9,552,440 B1* | 1/2017 | Krecichwost | G06F 17/30905 |
| 2002/0138834 A1 | 9/2002 | Gerba et al. | |
| 2013/0147971 A1* | 6/2013 | Flynn, III | H04N 5/225 |
| | | | 348/207.1 |
| 2013/0179271 A1* | 7/2013 | Adams | G06Q 30/0241 |
| | | | 705/14.66 |
| 2014/0006944 A1* | 1/2014 | Selig | G06F 9/453 |
| | | | 715/705 |
| 2014/0180823 A1* | 6/2014 | Terrell, II | G06Q 30/02 |
| | | | 705/14.64 |
| 2015/0287073 A1* | 10/2015 | Liu | G06Q 30/0246 |
| | | | 705/14.45 |
| 2018/0232121 A1* | 8/2018 | Lewis | G06F 3/0481 |

OTHER PUBLICATIONS

MSN, "Richest countries in the world", (Oct. 27, 2014), <URL https://www.msn.com/en-ae/money/today/richest-countries-in-the-world/ss-BBbE2tX#image=1/>, p. 1-10 (Year: 2014).*

Swanner, "Google improves mobile product listings, makes cards horizontally scrollable", (Oct. 18, 2013), <URL https://androidcommunity.com/google-improves-mobile-product-listings-makes-cards-horizontally-scrollable-20131018/>, p. 1-2 (Year: 2013).*

Anderson, "External URL Slides", (Nov. 12, 2014), <URL https://www.metaslider.com/documentation/external-url-slides/>, p. 1-2 Year: (2014).*

United States Office Action, U.S. Appl. No. 14/798,281, dated Nov. 1, 2017, eleven pages.

United States Office Action, U.S. Appl. No. 14/798,281, dated Aug. 9, 2018, twelve pages.

* cited by examiner

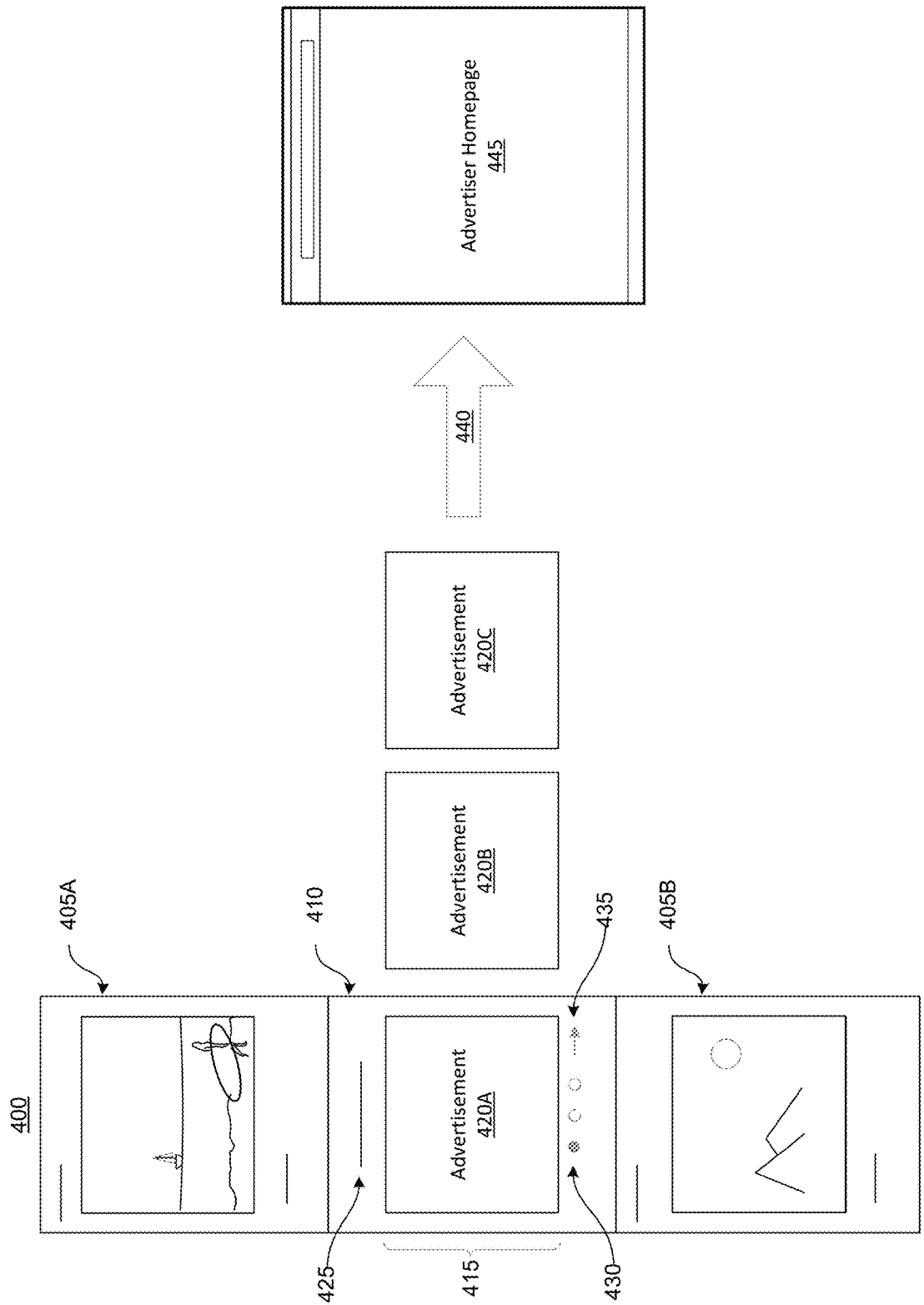

PRESENTING ADDITIONAL CONTENT TO AN ONLINE SYSTEM USER BASED ON USER INTERACTION WITH A SCROLLABLE CONTENT UNIT

BACKGROUND

This invention relates generally to online systems, and more specifically to presenting content to an online system user.

Online systems, such as social networking systems, allow users to connect to and communicate with other users of the online system. Users create profiles on an online system that are tied to their identities and include information about the users, such as interests and demographic information. The users may be individuals or entities such as corporations or charities. Because of the increasing popularity of online systems, and the significant amount of user-specific information maintained by online systems, an online system allows users to easily communicate information about themselves to other users and share content with other users. For example, an online photo and video sharing system generates content feeds for presenting photos and videos uploaded by its users to other users. In addition to photos and videos, other types of content uploaded and shared by online system users may be presented, such as stories describing actions performed by online system users, status updates, event announcements, activity invitations, location check-ins, or any other suitable information.

Additionally, entities may sponsor presentation of content items via an online system to gain public attention for the entity's products or services, or to persuade online system users to take an action regarding the entity's products or services. Many online systems receive compensation from an entity for presenting online system users with certain types of sponsored content items provided by the entity. Frequently, online systems charge an entity for each presentation of sponsored content to an online system user (e.g., each "impression" of the sponsored content) or for each interaction with sponsored content by an online system user (e.g., each "conversion"). For example, an online system receives compensation from an entity each time a content item provided by the entity is displayed to a user on the online system or each time a presented with the content item requests additional information about a product or service described by the content item by interacting with the content item (e.g., requests a product information page by interacting with the content item).

Online systems commonly present their users with a feed of content items including sponsored content items as well as content items selected for presentation to the users by the online system based on the content items and characteristics of the user. As users of online systems more frequently access content via mobile devices or other devices with a limited display area, an online system may combine multiple content items into a scrollable content unit to reduce the display area in which content is presented without reducing the amount of content presented to users. For example, a feed of content presented on a mobile device may include a scrollable content unit including multiple content items and presenting a single content item to a user at one time. When a user interacts with the scrollable content unit, a different content item included in the scrollable content unit is presented to the user. This allows an online system to present multiple content items in a minimally obtrusive manner while increasing a number of content items capable of presentation to the user, which increases the number of opportunities for the online system to obtain revenue from entities in exchange for presenting content items.

Conventional scrollable content units presented on a client device allow users to navigate through the scrollable content units via certain interactions with a scrollable content unit. For example, a user performs one or more interactions with a portion of a display device presenting a scrollable content unit to view different content items included in the scrollable content unit (e.g., by swiping a portion of a touchscreen interface presenting a content item from the scrollable content unit with a finger or stylus). However, conventional scrollable content units merely allow users to view different content items included in the scrollable content units and do not allow a user to easily additional content associated with one or more content items included in the scrollable content unit (e.g., a web page or website associated with a content item in the scrollable content unit or an additional feed of content associated with a content item in the scrollable content unit). For example, conventional scrollable content units do not allow users to access additional content associated with a content item included in a scrollable content unit through one or more interactions with the scrollable content unit.

Conventionally, to access additional content associated with a content item included in a scrollable content unit, a user accesses a link associated with the additional content within a content item included in the scrollable content unit, causing presentation of the additional content in place of the feed including the scrollable content unit. Alternatively, the user navigates away from the feed including the scrollable content unit and manually enters a link to access the additional content. However, these interactions require additional effort by the user and increase the complexity of the user accessing additional content. This increased complexity in accessing additional content may reduce user interaction with the feed of content item, which may reduce opportunities for the online system to generate revenue from presenting content items sponsored by an entity to users.

SUMMARY

To enhance user experience, an online system presents a feed of content including content items and one or more scrollable content units to a user of the online system. Each scrollable content unit includes an ordered set of content items sharing a common attribute. Content items in the set of content items may be sponsored by an entity or selected for presentation to the user by the online system based on attributes of the content items and characteristics of the user. For example, a scrollable content unit includes advertisements each associated with the same advertising campaign. In various embodiments, the scrollable content unit is scrollable in a direction that is orthogonal to an orientation of the feed so additional content items from the set are displayed within the scrollable advertisement unit the user navigates through the scrollable advertisement unit. For example, a scrollable content unit presented in a vertically-oriented content feed includes a set of advertisements from ad requests relating to a common advertising campaign and is horizontally scrollable so that additional advertisements from the set are displayed in the scrollable content unit as a user interacts with the scrollable content unit (e.g., when a user performs a horizontal gesture with a portion of a display device presenting the scrollable advertisement unit). After all content items in the ordered set of content items in the scrollable content unit have been presented to the user, an additional interaction by the user with the scrollable advertisement unit causes the online system to retrieve and present additional content associated with the ordered set of content items. For example, the online system communicates a landing page associated with the ordered set of content items in response to receiving an additional interaction with the scrollable content unit after presenting all content items in the ordered set of content items to the user. As a specific example, the online system presents a single-column feed of content to a user's client device that includes a scrollable content unit presenting advertisements in the feed along content selected for the user by the online system. As the user navigates (e.g., swipes horizontally) through the scrollable content unit, additional advertisements from a set of ad requests associated with the same advertiser are displayed in an order based on the set. When the scrollable content unit presents a final advertisement and receives an additional interaction to navigate through the scrollable content unit, the online system obtains additional content associated with the advertiser (e.g., a web page or a web site associated with the advertiser) and presents the additional content to the user.

In one embodiment, the online system automatically navigates through content items presented by the scrollable content unit if a user interacted with the scrollable content unit and an additional interaction to navigate through the scrollable content unit has not been received within a threshold period of time from receipt of the user's interaction with the scrollable content unit. For example, a scrollable content unit automatically presents another content item from the set after the scrollable content unit has presented a content item form the set for a threshold amount of time. In some embodiments, the scrollable content unit continues to modify the presented content item until an interaction with the scrollable content item is received. In one embodiment, when navigating between content items in the set, the scrollable content unit scrolls with parallax to create an illusion that a displayed content item is three-dimensional. For example, background images or text in an advertisement displayed in a scrollable content unit scrolls or otherwise moves at a slower rate than foreground images or text in the advertisement. In one embodiment, the rate at which content included in the scrollable content unit scrolls depends on one more characteristics of a user's interaction with content presented in the feed of content items, such as a rate at which a user navigates through content items in the feed. Additionally, the scrollable content unit may present information identifying the common attribute associated with content items in a display area. For example, the scrollable content unit presents a text bar, a graphic or icon appears in the scrollable content unit's display area identifying the common attribute shared by the ordered set of content items, such as a caption identifying an advertiser. As another example, the scrollable content unit presents text or image data to encourage user interaction with the scrollable content unit. For example, if the user has not navigated through content items presented by the scrollable content unit for a threshold period of time, a text bar or image prompting the user to interact with the scrollable content unit is presented by the scrollable content unit along with a content item to encourage user interaction with the scrollable content unit. In one embodiment, a link associated with a landing page is also included in the scrollable content unit.

In various embodiments, the scrollable content unit includes an ordered set of content items describing actions performed by users of the online system or content provided by users to the online system that the online system does not receive compensation for presenting (i.e., "organic" content items) and allows the user to view additional content associated with a common attribute of content items in the ordered set. For example, a scrollable content unit includes an ordered set of organic content items each associated with a common topic, such as photographs from a particular vacation of a user and stored on the online system. When all content items in the ordered set included in the scrollable content unit have been presented to a user, a further interaction by the user with the scrollable content unit to view an additional content item causes the online system to present an additional feed of content including content items having additional content items associated with the common topic to the user. In the preceding example, the online system presents the user with additional photographs from the particular vacation of the user and stored on the online system.

BRIEF DESCRIPTION OF THE DRAWINGS

FIG. 4A is an example of presenting a page external to an online system associated with a scrollable content unit presented by the online system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
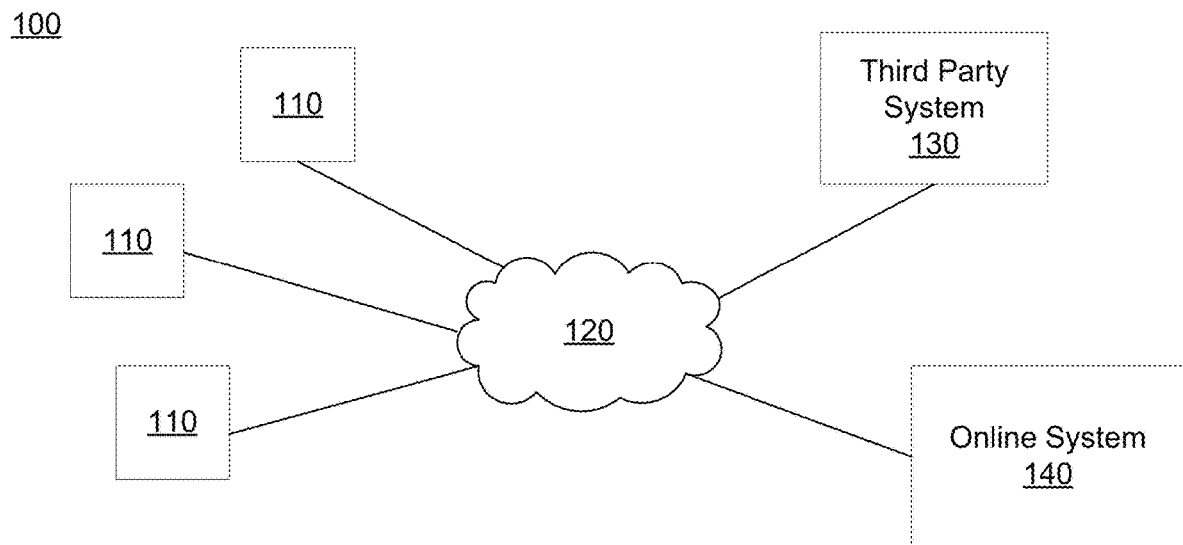
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
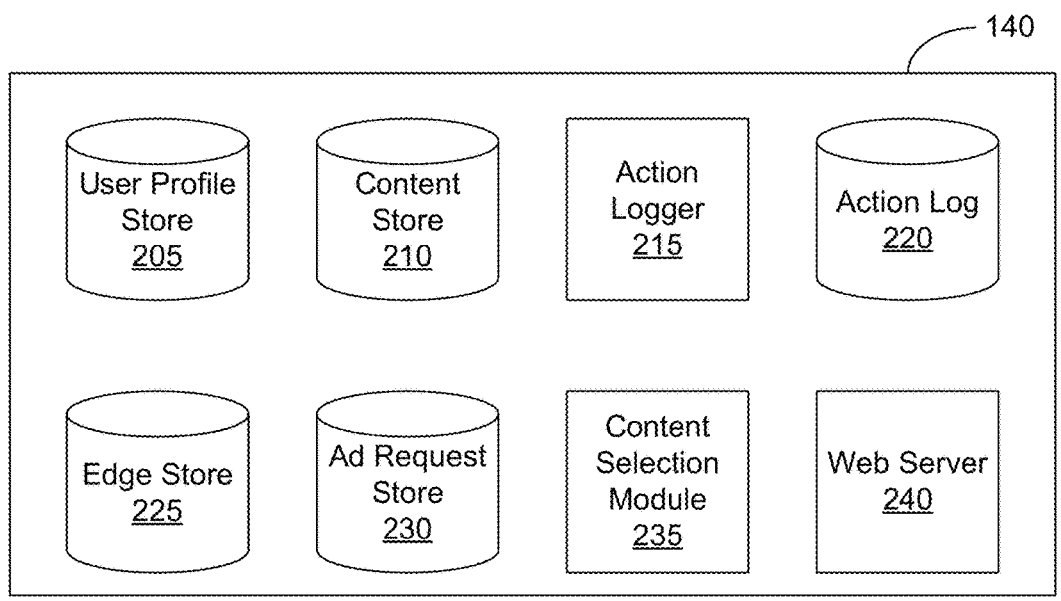
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an ad request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with user who have interacted with the brand page or with other content associated with the entity, allowing the brand page to include information personalized to a user when presented to the user.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

In some embodiments, the action logger 215 receives communications about user actions with content presented to a user and populates the action log 220 with information about the actions. Examples of interactions with content include viewing content items, requesting additional content for presentation, indicating a preference for presented content, sharing content with another user, or performing any other suitable action. A user may interact with content items by providing inputs to a client device 110 presenting content form the online system 140. For example, cursor movements, mouse clicks, and tactile gestures received via a touchscreen received by a client device 110 correspond to various interactions with content provided by the online system 140. Example tactile gestures received via a touchscreen interface include swiping, tapping, pressing, and contacting and holding pressure in an area on the touchscreen, as well as rotating the touchscreen or any other suitable user input for requesting content from the online system 140 for presentation.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 for storing in the action log 220 by the application for recordation and association with the user by the online system 140.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by an advertiser to the online system 140 if an advertisement in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the advertiser if an advertisement in an ad request is displayed. In some embodiments, the expected value to the online system 140 of presenting the advertisement may be determined by multiplying the bid amount by a probability of the advertisement being accessed by a user.

Additionally, an ad request may include one or more targeting criteria specified by the advertiser. Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with an advertisement from an ad request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the viewing user. For example, the content selection module 235 determines measures of relevance of various content items to the user based on characteristics associated with the user by the online system 140 and based on the user's affinity for different content items. Information associated with the user and included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 140 for presenting an advertisement from an ad request or a content item. For example, the expected value associated with an ad request is a product of the ad request's bid amount and a likelihood of the user interacting with the ad content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, stories or other data associated with users connected to the identified user are retrieved. Additionally, one or more ad requests may be retrieved from the ad request store 230. The retrieved stories, ad requests, or other content items, are analyzed by the content selection module 235 to identify candidate content that is likely to be relevant to the identified user. For example, stories associated with users not connected to the identified user or stories associated with users for which the identified user has less than a threshold affinity are discarded as candidate content. Based on various criteria, the content selection module 235 selects one or more of the content items or ad requests identified as candidate content for presentation to the identified user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine the order in which selected content items or advertisements are presented via the feed. For example, the content selection module 235 orders content items or advertisements in the feed based on likelihoods of the user interacting with various content items or advertisements.

When generating a feed of content items for presentation to a user, the content selection module 235 generates one or more scrollable content units for inclusion in the feed along with content items in various embodiments. The scrollable content unit includes a display area and an ordered set of content items. In various embodiments, content items in the ordered set each have a common attribute. For example, the ordered set of content items includes advertisements from ad requests associated with a common advertising campaign or content items associated with a common subject or topic. Content items included in the ordered set of content items may include advertisements from ad requests as well as content items selected for the user by the online system 140 without accounting for bid amounts associated with the content items ("organic content items"). In various embodiments, the ordered set of content items includes only organic content items, only advertisements, or both organic content items and advertisements. Content items in the ordered set may be tagged with information, including a subject, a timeframe, a sentiment, a preference, or any other relevant information that may be used by the content selection module 235 for identifying and selecting content items for display in a scrollable content unit. In some of these embodiments, a common attribute shared by the content items of the ordered set of content items is determined from the tagged information associated with various content items. For example, the scrollable content unit displays an ordered set of photographs from the content store 210 that are each tagged with information identifying a particular user of the online system 140. When a user interacts with the scrollable content unit, a content item presented in the display area of the scrollable content unit changes. In some embodiments, the scrollable content unit scrolls in a direction orthogonal to an orientation of the feed of content item when the user interacts with the scrollable content unit. For example, if the scrollable content unit is presented in a vertically-oriented feed of content items, the scrollable content unit horizontally scrolls through the ordered set of content items based on user interactions with the scrollable content unit. In various embodiments, after all of the content items in the ordered set have been presented to the user, an interaction with the scrollable content unit by the user causes the content selection module 235 to retrieve additional information associated with the common attribute of content items in the ordered set and to present the additional information to the user. For example, the content selection module 235 retrieves and presents a web page or a web site associated with the common attribute. Scrollable content units are further described below in conjunction with FIGS. 3-4B.

Additionally, a scrollable content unit may include additional characteristics in various embodiments to increase user interaction with the scrollable content unit, which may increase a number of opportunities for the online system 140 to earn revenue from presentation of content items to users in a feed of content items. In one embodiment, the scrollable content unit automatically navigates through content items in the ordered set. For example, after the user interacts with the scrollable content unit, the scrollable content unit changes the content item from the orders set of content items displayed by the scrollable content unit at a periodic time interval, even if the user does not subsequently interact with the scrollable content unit. As an example, a scrollable content unit scrolls presents an additional content item from the ordered set if a content item is displayed by the scrollable content unit for at least a threshold amount of time and displays different content items from the set at periodic intervals until a user interaction with the scrollable content unit is received. In some embodiments, the scrollable content unit navigates through content items in the ordered set with parallax to create an illusion that a displayed content item is three-dimensional. For example, background images or text displayed in the scrollable content unit scroll at a different rate than foreground images or text. In one embodiment, the rate at which the scrollable content unit scrolls is based on the rate at which the user has navigated through the feed of content items.

Additionally, informational elements, such as text bars, graphics or icons may be presented in the scrollable content unit's display area to provide information about content items included in the ordered set of content items, such as the common attribute shared by content items in the ordered set. For example, a scrollable content unit presents a caption in its display area providing information about an advertising campaign associated with a content item displayed by the scrollable content unit. In some embodiments, informational elements presented by the scrollable content unit are presented to increase the likelihood of the user interacting with the scrollable content unit. For example, if the user has not navigated between content items in the ordered set of content items for at least threshold period of time, a text bar, icon, or graphic is presented in the display area of the scrollable content unit encouraging the user to perform an interaction with the scrollable content unit (e.g., the text "swipe left" is presented). In some embodiments, a link to a landing page associated with one or more content items in the ordered set is presented in the display area of the scrollable content unit, allowing the user to access the landing page by interacting with the link (e.g., contacting a portion of a display device in which the link is presented).

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
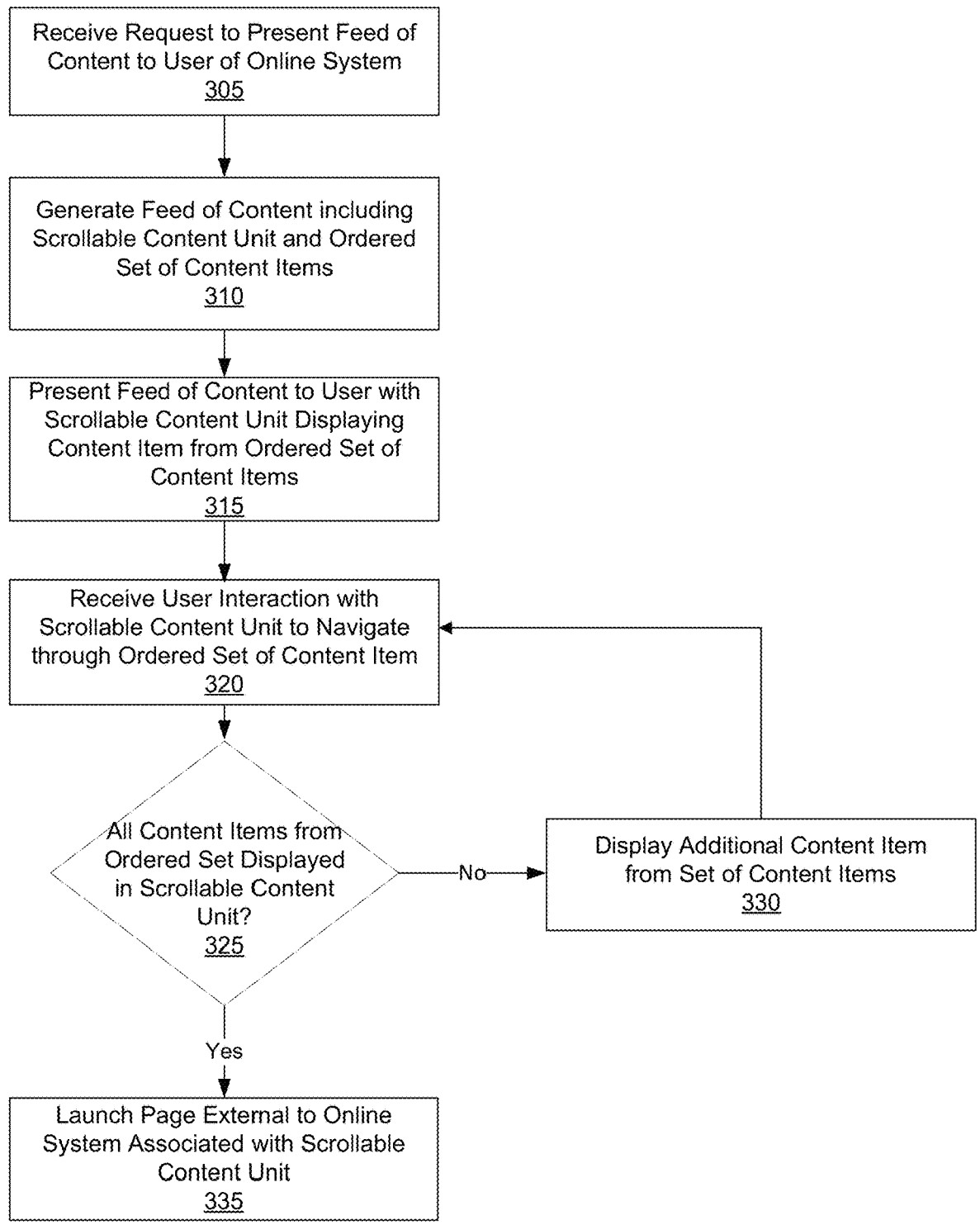
FIG. 3 is a flowchart of a method for presenting additional content associated with content displayed in a scrollable content unit, in accordance with an embodiment.

Launching a Page Associated with Content Displayed in a Scrollable Content Unit Based on User Interactions with the Scrollable Content Unit FIG. 3 is a flowchart of one embodiment of a method for presenting a scrollable content unit to a user of an online system 140 and presenting additional content to the user based on received interactions with the scrollable content unit. In other embodiments, the method may include different and/or additional steps than those shown in FIG. 3. Additionally, steps of the method may be performed in different orders than the order described in conjunction with FIG. 3 in various embodiments.

The online system 140 receives a request from a user of the online system 140 to present 305 a feed of content (or a "content feed") for display to the user. For example, the online system 140 receives 305 a request from a client device 110 associated with the user to present a feed of image and video content to the user via the client device 110. As another example, the online system 140 receives 305 a request from the client device 110 to present a feed of content identifying content provided to the online system 140 or actions performed by other users of the online system 140. In response to receiving 305 the request, the online system 140 generates 310 a feed of content including content items and at least one scrollable content unit, which includes an ordered set of content items associated with a common attribute and a display area. Content items included in the feed of content are selected based on measures of relevance of content items to the user and bid amounts associated with content items, such as advertisements included in ad requests, as further described above in conjunction with FIG. 2. Content items included in the feed of content may be selected from content items and ad requests stored by the online system 140, from content items or ad requests maintained by a third party system 130, from content items or ad requests included in an application, from content items or ad requests stored by the client device 110 from which the request was received, or from any suitable source. In various embodiments, the feed of content items includes content items that are not associated with bid amounts ("organic content items") as well as advertisements from ad requests.

The ordered set of content items included in the scrollable content unit share a common attribute. For example, content items included in the ordered set are advertisements from ad requests associated with the same advertiser, with the same advertising campaign, with the same product, and/or with the same service. In some embodiments, content items in the ordered set are organic content items or advertisements associated with the same image data, with the same video data, with the same user, with the same topic, with the same action (e.g., shared with other users, receive an indication of preference from other users), and/or tagged with the same metadata (e.g., date, time, storage location).

When generating 310 the feed of content, the online system 140 determines an order in which to arrange the ordered set of content items included in the scrollable content unit. For example, the content items in the set are ranked based on predicted likelihoods of the user interacting with various content items in the set, with the content items ordered in the set based on the predicted likelihoods. For example, content items having higher predicted likelihoods of user interaction are ordered earlier in the set than content items having lower likelihoods of user interaction.

The display area of the scrollable content unit includes at least one of the content items from the ordered set of content items. In some embodiments, the display area presents a single content item from the ordered set, while in other embodiments, the display area presents multiple content items from the ordered set, but fewer than the total number of content items in the ordered set. In addition, the scrollable content unit includes a link to additional content, such as a landing page or an application. One or more interactions are associated with the scrollable content unit to allow a user to modify the content item from the ordered set presented by the display area, allowing the user to navigate through the ordered set of content items. In various embodiment, when modifying the content item presented in the display area, the scrollable content unit scrolls in a direction that is orthogonal to an orientation of the feed of content in which the scrollable content unit is presented. For example, a scrollable content unit provided in a feed of content having a vertical orientation is scrollable in a horizontal direction. The scrollable content unit may also include other elements such as navigational and informational components including (e.g., a text bar, an icon, a window, a frame, a section, a scroll bar, a tab, an image, a video, an audio file, a menu, a button, a checkbox, a message, a post, a hyperlink, an input field), and one or more interactive elements.

After generating 310 the feed of content, the online system 140 presents 315 the feed to the user with a content item from the ordered set of content items presented in the display area of the scrollable content unit. For example, the online system 140 communicates the feed to a client device 110 for presentation to the user. The feed of content includes the selected content items and a content item from the ordered set of content items presented in the display area of the scrollable content unit. For example, the online system 140 delivers a feed including content items that are photographs associated with a user's user profile and a scrollable content unit displaying an advertisement from an ordered set of advertisements to a client device 110 associated with the user.

While the feed of content is presented 315 to the user, the online system 140 receives 320 an interaction with the scrollable content unit from the user to navigate through the ordered set of content items. For example, the online system 140 receives a user input to present an alternative content item from the ordered set of content items in the display area of the scrollable content unit. For example, the client device 110 receives 320 a tactile gesture input (e.g., a horizontal swiping gesture) with a portion of a display device of the client device 110 presenting the display area of the scrollable content unit, the client device 110 may communicate information describing the received input to the online system 140, which retrieves one or more other content items from the ordered set and presents the one or more other content items in the display area of the scrollable content unit. Alternatively, an application associated with the online system 140 executing on the client device 110 identifies an additional content item from the ordered set of content items and presents the additional content item in the display area of the scrollable content unit. In various embodiments, different interactions with the scrollable content unit Example interactions with the scrollable content unit to navigate through the ordered set of content items include: movements of a cursor, clicking on a portion of a display device presenting the display area, tactile gestures in the portion of the display device presenting the display area (e.g., swiping, tapping, pressing, or touching and holding), rotating the display device of the client device 110, and any other suitable user input. In some embodiments, when navigating between content items in the ordered set, the display area of the scrollable content unit scrolls between content items with parallax so content displayed in the display area appears three-dimensional. For example, background images or text in a content item presented in the display area of the scrollable content unit scrolls at a slower rate than foreground images or text in the presented content item. A rate at which a user scrolls through the feed of content may determines a rate at which the scrollable content unit scrolls between the contents items in the ordered set.

Additionally, the online system 140 may receive interactions with the scrollable content unit to perform various other actions relating to a content items displayed in the display area of the scrollable content unit via the online system 140. For example, based on various interactions with the scrollable content unit, the online system 140 indicates a preference of the user for the content item presented in the display area of the scrollable content unit, shares the content item presented in the display area of the scrollable content unit with another user, obtains more information associated with the content item presented in the display area of the scrollable content unit, obtains information associated with a user, an application, or a third party system 130 associated with the content item presented in the display area of the scrollable content unit, or performs other suitable actions. Additionally, third party systems 130 associated with content items in the ordered set of content items may provide the online system 140 with compensation for displaying advertisements from ad requests in the display area of the scrollable content unit or for certain user interactions with advertisements in ad requests that are presented in the display area of the scrollable content unit.

In one embodiment, the online system 140 prompts a user to interact with the scrollable content unit if at least a threshold amount of time has elapsed without the user interacting with the scrollable content unit. For example, the online system 140 presents text data identifying an interaction with the scrollable content unit for the user to perform (e.g., a text box including the words "swipe left") superimposed on a content item displaying in the display area of the scrollable content unit if the scrollable content unit has presented a content item for at least 15 seconds without receiving an interaction. Various information may be presented to encourage user interaction with the scrollable content unit. For example, text information, one or more images, an icon, or video data may be presented in the display area of the scrollable content unit. In some embodiments, audio data is presented by the client device 110 to encourage user interaction with the scrollable content unit. In some embodiments, information encouraging user interaction with a scrollable content unit is presented in multiple formats (e.g., both image and text data, both video and image data). Alternatively, the online system 140 automatically modifies a content item from the ordered set of content items presented in the display area of the scrollable content unit if an input to navigate through the ordered set of content items is not received within a threshold time interval of presentation of a content item in the display area of the scrollable content unit. For example, if an advertisement from the ordered set of content items is presented in the display area of the scrollable content unit and the online system 140 has not received an interaction to present an additional content item from the ordered set within a threshold time interval, the online system 140 automatically modifies the display area of the scrollable content unit to present another content item from the ordered set.

In response to receiving 320 an interaction to navigate through the content items included in the ordered set of content items included in the scrollable content unit, the online system 140 determines 325 whether all content items from the ordered set of content items have been displayed in the display area of the scrollable content unit. For example, the online system 140 retrieves stored information identifying content items presented to the user via the scrollable content unit. Based on the stored information, the online system 140 determines if each content item from the ordered set has previously been presented to the user via the scrollable content unit. In one embodiment, each content item in the ordered set included in the scrollable content unit is associated with a descriptor indicating whether the content item has been displayed or has not been displayed. The descriptor associated with a content item in the ordered set is updated when the content item is displayed in the scrollable content unit and the online system 140; hence, the online system 140 determines 325 whether descriptors associated with all content items in the ordered set indicate the content items have been displayed.

If the online system 140 determines 325 that one or more content items in the ordered set have not been displayed in the display area of the scrollable content unit, the online system 140 displays 330 an additional content item from the ordered set that has not been displayed in the display area in response to the received interaction. However, if the online system 140 determines 325 that all content items from the ordered set of content items have been displayed in the display are of the scrollable content unit, the online system 140 retrieves and presents 335 additional information associated with the content items in the ordered set of content items in response to the received input. In some embodiments, the online system 140 presents 335 a page external to the online system 140 that is associated with content items in the ordered set of content items. For example, if the ordered set of content items includes advertisements and all advertisements in the ordered set have been presented via the display area of the scrollable content unit, when an interaction to navigate through the ordered set of content items is received 320, the online system 140 presents 335 a page external to the online system 140 that is associated with an advertiser associated with each advertisement in the ordered set of content items.

In some embodiments, rather than retrieve and present 335 additional content external to the online system 140, the online system 140 generates an additional feed of content including additional content items associated with a common attribute shared by each content item in the ordered set of content items when an input to navigate through the ordered set of content items is received 320 and all content items in the ordered set of content items have previously been presented in the display area of the scrollable content unit. The generated additional feed is then presented 335 to the user in place of the feed of content including the scrollable content unit. For example, the additional feed includes additional content items associated with a user or topic associated with the content items in the ordered set of content items included in the scrollable content item. In particular embodiments, the additional feed of content includes one or more additional scrollable content units.

Figure 4B:
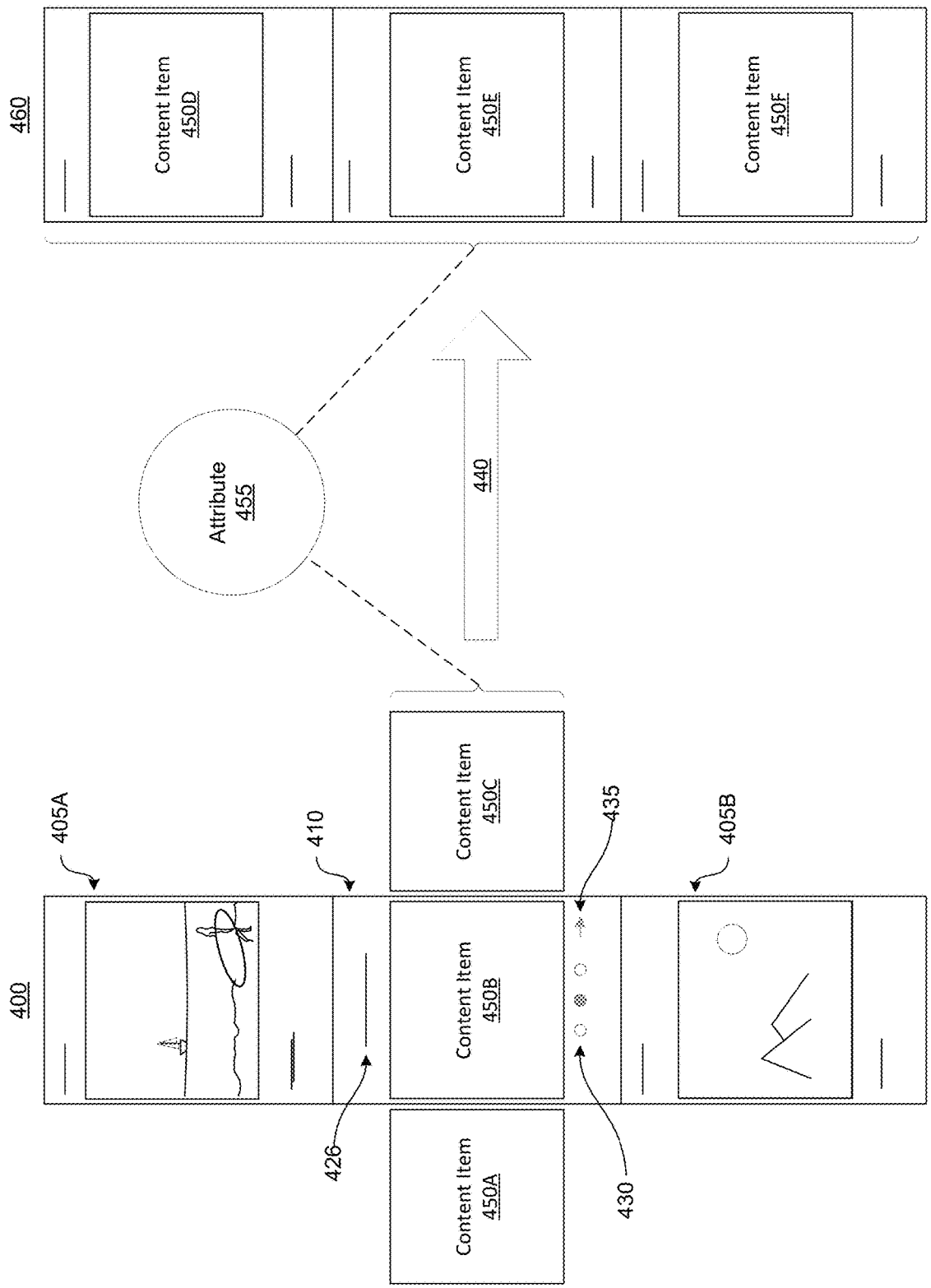
FIG. 4B shows an example of presenting a page including organic content items associated with a scrollable content unit presented by the online system, in accordance with an embodiment.

FIGS. 4A and 4B are examples of presenting additional content associated with content items in a scrollable content unit presented to a user based on user interaction with the scrollable content unit. In FIG. 4A, a content feed 400 including a plurality of content items 405A-B and a scrollable content unit 410 is presented to a user. The scrollable content unit 410 includes an ordered set of content items selected and ordered for the user by the online system 140 and a display area 415 that presents one or more of the content items from the ordered set. Additionally, the scrollable content unit 410 includes a link to additional content external to the online system 140, such as a landing page, and is associated with one or more interactions causing the scrollable content unit 410 to modify a content item from the ordered set presented in the display area 415. Content items in the ordered set of content items share at least one common attribute with each other. For example, in the example of FIG. 4A, each content item the ordered set of content items is an advertisement 420A-C from ad requests that are associated with the same advertiser. In other embodiments, advertisements 420A-C in the ordered set of content items are associated with the same advertiser, advertising campaign, product, and/or service. Referring to FIG. 4B, each content item 450A-C in the ordered set of content items is an organic content item (e.g., a photograph, an image, a video) provided to the online system 140 by a user associated with at least one common attribute 455, such as a common subject or a common topic. In other embodiments, the common attribute 455 of the content items 450A-450C in the ordered set of content items is a user, a date, a location, an action performed by one or more users and associated with the content items 450A-C, or any other suitable attribute of the organic content items.

As described above in conjunction with FIGS. 2 and 3, the scrollable content unit 410 is scrollable in a direction orthogonal to an orientation of the content feed 400 so different content items from the ordered set of content items scroll in the direction orthogonal to the orientation of the content feed 400 when different content items from the ordered set are presented in the display area 415. In particular embodiments, the scrollable content unit 410 presents a different content item from the ordered set in response to the user interaction with the scrollable content unit 410. For example, the scrollable content unit 410 presents an alternative content item from the ordered set of content items in the display area 415 in response to receiving cursor movements, mouse clicks, or tactile gestures communicated to the online system 140 via a client device 110 presenting the scrollable content unit 410. Example tactile gestures include a swiping gesture in a region of a display device presenting the display area 415, a tap in the region of the display device presenting the display area 415, and pressing on the portion of the display device presenting the display area, as well as a rotation the display device presenting the display area 415. In some embodiments, the online system 140 automatically scrolls the scrollable content unit 410 if no interaction with the scrollable content unit is received during a threshold time interval. For example, the online system 140 automatically modifies the content item presented in the display area 415 of the scrollable content unit 410 if a user does not interact with the scrollable content unit 410 within a threshold time interval of the display area 415 presenting a content item.

The scrollable content unit 410 may also various navigational or informational components that provide a user with additional information about content in the scrollable content unit 410 and/or additional mechanisms for navigating through content in the scrollable content unit 410 in some embodiments. In the examples of FIGS. 4A and 4B, the scrollable content unit 410 includes an interactive icon 435 and presents an alternative content item from the ordered set via the display area 415 in response to a user interacting with the interactive icon 435. In FIG. 4A, a text box 425 presented in an upper portion of the display area 415 provides information about an advertiser associated with an ad request including an advertisement displayed in the display area 415. Similarly, in FIG. 4B, a text box 426 presented in the upper portion of the display area 415 provides information about organic content displayed in the display area, such as a subject, a title, a user, a time, a location, or any other suitable information for describing content displayed in the display area 415. Additionally, the scrollable content unit 410 in FIGS. 4A and 4B also includes an icon 430 in a lower portion of the display area 415 indicating a position of the content item presented in the display area 415 relative to other content items in the ordered set or content items. In other embodiments, the scrollable content unit 410 includes a link identifying a location external to the online system 140 or internal to the online system 140 that is associated with additional content associated with content items in the ordered set of content items. For example, the link is a hyperlink to a page internal or external to the online system associated with content displayed in the scrollable content unit 410 and directs the user to the page when accessed. Other components may be included in the scrollable content unit 410 in various embodiments.

In the example of FIG. 4A, the ordered set of content items comprises three advertisements 420A-C associated with a common advertiser. The first advertisement 420A of the ordered set is displayed in the display area 415 of the scrollable content unit 410 when the content feed 400 is presented to the user. In response to receiving an interaction with the scrollable content unit 410 to navigate through the ordered set of content items (e.g., a user swipe on a touchscreen interface on which the content feed 400 is presented), a client device 110 presenting the scrollable content unit 410 communicates the interaction to the online system 140, which determines whether all content items form the ordered set of content items have been presented in the display area 415. If fewer than all of the content items in the ordered set have been presented by the display area 415, the online system 140 modifies the display area 415 to present the second advertisement 420B from the ordered set. When an additional input to navigate through the ordered set of content items is received, the online system 140 again determines whether all content items in the ordered set have been presented via the display area 415; in response to determining less than all content items in the ordered set of content items have been presented via the display area 415, the online system 140 modifies the display area 415 to present the third advertisement 420C in the display area 415. While the third advertisement 420C is presented in the display area 415, the user interacts with the scrollable content unit 410 to present an additional ad request from the ordered set, and the online system 140 again determines whether all advertisements in the ordered set of content items have been presented. Because displaying the third advertisement 420C in the display area 415 has caused all advertisements 420A-C in the ordered set to be displayed, the online system 140 presents 440 additional content associated with the advertisements 420A-C in the ordered set. In the example of FIG. 4, the additional content is a homepage 445 of the advertiser associated with the advertisements 420A-C in the ordered set. In other embodiments, the additional content may be a home page of a product, a page associated with an online store, or any other suitable page associated with advertisements 420A-C in the ordered set. While FIG. 4A shows presentation 440 of a page external to the online system 140, in other embodiments, the additional content may be maintained by the online system 140, such as a brand page associated with the advertiser associated with the ad requests 420A-C. Alternatively, the additional content is an application associated with the content items in the ordered set of content items, such as an application associated with an advertiser associated with the advertisements 420A-C, so presentation of the additional content executes the application, if it is installed on a client device 110 presenting the feed 400, or presents a prompt to install the application on the client device 110.

Similarly, in the example of FIG. 4B, the ordered set of content items includes three organic content items 450A-C sharing a common attribute 455. For example, each organic content item is content uploaded to the online system 140 by a user. When the content feed 400 is initially presented to a user, the display area 415 of the scrollable content unit 410 presents the first content item 450A from the ordered set. In response to receiving an interaction with the scrollable content unit 410 to navigate through the ordered set of content items (e.g., a user swipe on a touchscreen interface on which the content feed 400 is presented), a client device 110 presenting the scrollable content unit 410 communicates the interaction to the online system 140, which determines whether all content items form the ordered set of content items have been presented in the display area 415. If fewer than all of the content items in the ordered set have been presented by the display area 415, the online system 140 modifies the display area 415 to present the second organic content item 450B from the ordered set. When an additional input to navigate through the ordered set of content items 410 is received, the online system 140 again determines whether all content items in the ordered set have been presented via the display area 415; in response to determining less than all content items in the ordered set of content items have been presented via the display area 415, the online system 140 modifies the display area 415 to present the organic content item 450C in the display area 415. While the organic content item 450C is presented in the display area 415, the user interacts with the scrollable content unit 410 to present an additional content item from the ordered set, and the online system 140 again determines whether all content items in the ordered set of content items have been presented. Because displaying the third organic content item 450C in the display area 415 has caused all organic content items 450A-C in the ordered set to be displayed, the online system presents 440 additional content associated with the organic content items 450A-C in the ordered set. In the example of FIG. 4B the additional content is a page 460 internal to the online system 140 including additional content items 450D-F sharing the same attribute 455 as the organic content items 450A-C in the ordered set of content items. For example, organic content items 450A-C in the ordered set of content items 450A-C are organic content items for which the user has previously indicated a preference and the page 460 is an additional content feed including other content items 450D-F for which the user has previously indicated a preference. As an additional example, the ordered set of content items includes organic content items 450A-C that are a set of videos from an album associated with the user including metadata identifying a location and or a time. After the display area 415 has presented all organic content items 450A-C in the ordered set and the user interacts with the scrollable content unit 410 to further navigate through the ordered set of content items, the online system 140 presents 440 an additional feed including additional organic content items 450D-F also including metadata identifying the location or the time.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system, a request to present a content feed to a user of the online system;
   receiving a scrollable content unit, the scrollable content unit including an ordered set of first content items, a display area for displaying fewer than all of the ordered set of first content items at a time, and a link to a page external to the online system associated with the scrollable content unit, the scrollable content unit associated with one or more interactions for modifying a content item displayed in the display area;
   generating the requested content feed, the content feed including:
      a plurality of second content items and the scrollable content unit arranged in a first direction, and
      the scrollable content unit displaying a first content item from the ordered set of first content items in the display area;
   presenting the content feed to the user, wherein each content item of the plurality of second content items and the scrollable content unit displaying the first content item from the ordered set of first content items are arranged in a single column aligned in the first direction;
   receiving a request to advance the scrollable content unit to navigate through the ordered set of first content items included in the scrollable content unit, the scrollable content unit scrollable in a direction orthogonal to the first direction;
   responsive to receiving the request to advance the scrollable content unit after when at least one content item from the ordered set of first content items has not been presented in the display area of the scrollable content unit, presenting the content item from the ordered set of first content items that has not previously been presented to the user in the display area of the scrollable content unit; and responsive to receiving the request to advance the scrollable content unit after each content item from the ordered set of first content items have previously been presented in the display area of the scrollable content unit, presenting the page external to the online system associated with the scrollable content unit.

2. The method of claim 1, wherein each content item in the ordered set of first content items shares a common attribute.

3. The method of claim 2, wherein the common attribute is selected from a group consisting of: an advertiser, an advertising campaign, a product, a service, and any combination thereof.

4. The method of claim 2, wherein the common attribute is selected from a group consisting of a user, a location, a time, an action associated with the first content items, a topic, a subject, and any combination thereof.

5. The method of claim 1, wherein the request to advance the scrollable content unit comprises one or more requests to display a next content item from the ordered set of first content items.

6. The method of claim 1, wherein a request to advance the scrollable content unit of the user to navigate through the ordered set of first content items included in the scrollable content unit is selected from a group consisting of: a swiping gesture in a region of a display device presenting the display area, a tap in the region of the display device presenting the display area, and pressing on the portion of the display device presenting the display area.

7. The method of claim 1, wherein receiving the request to advance the scrollable content unit of the user to navigate through the ordered set of first content items included in the scrollable content unit comprises:

presenting an alternative content item from the ordered set of first content items that has not previously been presented to the user in the display area of the scrollable content unit in response to the first content item from the ordered set of first content items being presented in the display area for at least a threshold amount of time.

8. The method of claim 1, wherein receiving the request to advance the scrollable content unit of the user to navigate through the ordered set of first content items included in the scrollable content unit comprises:

presenting a prompt to interact with the scrollable content unit to the user in response to the first content item from the ordered set of first content items being presented in the display area for at least a threshold amount of time without the user interacting with the scrollable content unit.

9. The method of claim 1, wherein the online system prompts the user to interact with the scrollable content unit if at least a threshold amount of time has elapsed without the user interacting with the scrollable content unit.

10. A computer program product comprising a non-transitory computer readable storage medium having instructions encoded thereon that, when executed by a processor, cause the processor to:

receive, at an online system, a request to present a content feed to a user of the online system;

receive a scrollable content unit, the scrollable content unit including an ordered set of first content items, a display area for displaying fewer than all of the ordered set of first content items at a time, and a link to a page external to the online system associated with the scrollable content unit, the scrollable content unit associated with one or more interactions for modifying a content item displayed in the display area;

generate the requested content feed, the content feed including:
a plurality of second content items and the scrollable content unit arranged in a first direction, and
the scrollable content unit displaying a first content item from the ordered set of first content items in the display area;

present the content feed to the user, wherein each content item of the plurality of second content items and the scrollable content unit displaying the first content item from the ordered set of first content items are arranged in a single column aligned in the first direction;

receive a request to advance the scrollable content unit to navigate through the ordered set of first content items included in the scrollable content unit, the scrollable content unit scrollable in a direction orthogonal to the first direction;

responsive to receiving the request to advance the scrollable content unit after when at least one content item from the ordered set of first content items has not been presented in the display area of the scrollable content unit, present the content item from the ordered set of first content items that has not previously been presented to the user in the display area of the scrollable content unit; and responsive to receiving the request to advance the scrollable content unit after each content item from the ordered set of first content items have previously been presented in the display area of the scrollable content unit, present the page external to the online system associated with the scrollable content unit.

11. The computer program product of claim 10, wherein each content item in the ordered set of first content items shares a common attribute.

12. The computer program product of claim 11, wherein the common attribute is selected from a group consisting of: an advertiser, an advertising campaign, a product, a service, and any combination thereof.

13. The computer program product of claim 11, wherein the common attribute is selected from a group consisting of a user, a location, a time, an action associated with the first content items, a topic, a subject, and any combination thereof.

14. The computer program product of claim 10, wherein the request to advance the scrollable content unit comprises one or more requests to display a next content item from the ordered set of first content items.

15. The computer program product of claim 10, wherein a request to advance the scrollable content unit of the user to navigate through the ordered set of first content items included in the scrollable content unit is selected from a group consisting of: a swiping gesture in a region of a display device presenting the display area, a tap in the region of the display device presenting the display area, and pressing on the portion of the display device presenting the display area.

16. The computer program product of claim 10, wherein receiving the request to advance the scrollable content unit of the user to navigate through the ordered set of first content items included in the scrollable content unit comprises:

presenting an alternative content item from the ordered set of first content items that has not previously been presented to the user in the display area of the scrollable content unit in response to the first content item from the ordered set of first content items being presented in the display area for at least a threshold amount of time.

17. The computer program product of claim 10, wherein receiving the request to advance the scrollable content unit of the user to navigate through the ordered set of first content items included in the scrollable content unit comprises:

presenting a prompt to interact with the scrollable content unit to the user in response to the first content item from the ordered set of first content items being presented in the display area for at least a threshold amount of time without the user interacting with the scrollable content unit.

18. A method comprising:

receiving, at an online system, a request to present a content feed to a user of the online system;

receiving a scrollable content unit, the scrollable content unit including an ordered set of first content items, a display area for displaying fewer than all of the ordered set of first content items at a time, and a link to additional content associated with the ordered set of first content items, the scrollable content unit associated with one or more interactions for modifying a content item displayed in the display area;

generating the requested content feed, the content feed including:

a plurality of second content items and the scrollable content unit arranged in a first direction, and the scrollable content unit displaying a first content item from the ordered set of first content items in the display area;

presenting the content feed to the user, wherein each content item of the plurality of second content items and the scrollable content unit displaying the first content item from the ordered set of first content items are arranged in a single column aligned in the first direction;

receiving a request to advance the scrollable content unit to navigate through the ordered set of first content items included in the scrollable content unit, the scrollable content unit scrollable in a direction orthogonal to the first direction;

responsive to receiving the request to advance the scrollable content unit after when at least one content item from the ordered set of first content items has not been presented in the display area of the scrollable content unit, presenting the content item from the ordered set of first content items that has not previously been presented to the user in the display area of the scrollable content unit; and responsive to receiving the request to advance the scrollable content unit after each content item from the ordered set of first content items have previously been presented in the display area of the scrollable content unit, presenting the additional content associated with the ordered set of first content items.

19. The method of claim 18, wherein the additional content associated with the ordered set of first content items comprises an additional feed including content items having an attribute matching an attribute common to content items in the ordered set of first content items.

20. The method of claim 18, wherein the additional content associated with the ordered set of first content items comprises a page associated with an attribute common to content items in the ordered set of first content items.

21. The method of claim 20, wherein the page is retrieved from a source external to the online system.

22. The method of claim 20, wherein the page is maintained by the online system.

* * * * *